(12) United States Patent
Paiuk

(10) Patent No.: US 12,081,599 B1
(45) Date of Patent: Sep. 3, 2024

(54) PRONUNCIATION SERVICES FOR VIDEO CONFERENCING

(71) Applicant: Zoom Video Communications, Inc., San Jose, CA (US)

(72) Inventor: Alejandro Martin Paiuk, West Hartford, CT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/134,876

(22) Filed: Apr. 14, 2023

(51) Int. Cl.
| | |
|---|---|
| H04L 65/1089 | (2022.01) |
| H04L 65/1093 | (2022.01) |
| H04L 65/403 | (2022.01) |
| H04L 67/306 | (2022.01) |

(52) U.S. Cl.
CPC ...... *H04L 65/1089* (2013.01); *H04L 65/1093* (2013.01); *H04L 67/306* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 2006/0121892 A1* | 6/2006 | Gass | .................. | H04L 67/14 455/418 |
| 2013/0205408 A1* | 8/2013 | Yerli | .................. | G06F 21/6254 726/28 |
| 2015/0135043 A1* | 5/2015 | Apps | .................. | G06Q 50/01 715/202 |
| 2023/0136344 A1* | 5/2023 | Balaji | .................. | H04L 12/1818 348/14.08 |
| 2023/0370565 A1* | 11/2023 | Muras | .................. | G06F 3/013 |

\* cited by examiner

*Primary Examiner* — Brian Whipple
(74) *Attorney, Agent, or Firm* — Kilpatrick Townsend & Stockton LLP

(57) ABSTRACT

Systems and methods for providing pronunciation services for video conferencing are described. A method includes receiving, by a video conference provider, an audio stream of a pronunciation of one or more words. The video conference provider may associate the audio stream of the pronunciation with a user of a first client device, in which the first client device is configured to join a video conference hosted by a video conference provider, the video conference having a plurality of participants using a plurality of client devices. The video conference provider then receives, from a second client device, a first indication to play back the pronunciation. Responsive to the first indication, the video conference may provide, to the second client device, the audio stream of the pronunciation. The video conference provider then outputs instructions to cause the second client device to play back the audio stream of the pronunciation.

20 Claims, 10 Drawing Sheets

PRONUNCIATION SERVICES FOR VIDEO CONFERENCING

FIELD

The present application generally relates to audio capture and playback, and more particularly relates to systems and methods for name pronunciation during video conferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
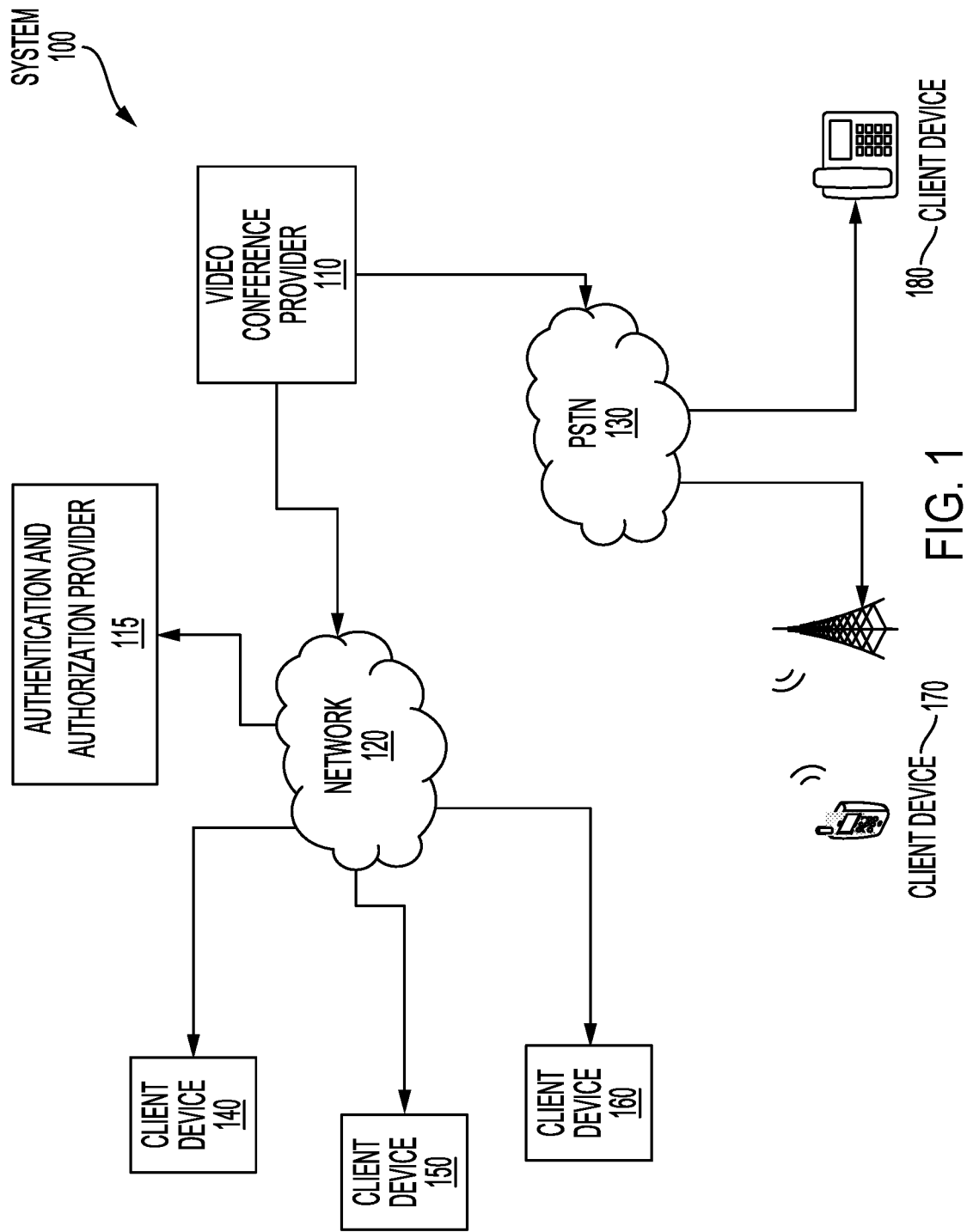
FIG. 1 shows an example system that provides videoconferencing functionality to various client devices.

Examples are described herein in the context of systems and methods for pronunciation services for video conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing continues to become an increasingly significant part of personal and business communications. The addition of video conferencing to many workflows has been accompanied by tight integration between personal identity and the tools used to conduct video conferencing. For example, carefully curated backgrounds, third-party applications, and detailed social media are common adjuncts to video conferencing technologies.

Moreover, as video conferencing has become more prevalent, particularly with regards to remote, global teams, the associated technologies have grown to meet the challenges that have accompanied connecting diverse, multi-lingual teams from varied backgrounds and cultures. For example, some video conferencing technologies can provide real-time translations for spoken language to facilitate cross-border communication. Other examples may include the ability to customize a representative icon or image, accessibility features, options for specifying a preferred name, gender, pronouns, and so on.

Video conferencing participants of different languages, dialects, and cultures may experience a range of barriers to effective communication. One common problem relates to pronunciation. Even when adequate tools exist for translation of spoken words, participants still need to address each other properly and correctly-a need that might not change with any technological upgrade. But pronunciation of names outside of one's experience can be difficult, even in one's own culture. Indeed, names or other words or phrases tied to identity may be mispronounced even in one's own familiar language or dialect due to simple inattention or forgetfulness. Mispronunciation of names, as well as other important, repeated details of spoken communication can lead to miscommunications, frustrations, wasted time, and loss of efficiency.

These difficulties can be addressed using systems and methods for pronunciation services for video conferencing. For example, in a video conference with multiple participants of varying languages and cultures, some participants may have difficulties pronouncing others' names or other important details from the conversation. Using the systems and methods described herein, a tool can be provided to allow participants to make recordings of pronunciations of various words or phrases, which can then be later played back under various circumstances to overcome some of the challenges discussed above. The recordings can be associated with a user and this association can be used in various contexts for playback of the recordings.

The following non-limiting example is provided to introduce certain embodiments. In one embodiment, a video conference provider receives an audio stream of a pronunciation of one or more words spoken by a user of a client device. For example, a first client device may be used by a user or video conference participant to join a video conference. In anticipation of joining the video conference, the user of the first client device may use an application provided by the first client device to record a pronunciation of their name. The user may have a commonly mispronounced name or may be meeting with individuals having a different language or culture. In other examples, the recording may be made while waiting to join a video conference (in the "waiting room"), during a video conference, while making profile updates, or during other scenarios. The application sends the audio stream of the recording to the video conference provider, where it is received. In some examples, the audio stream of the recording may be sent directly from one client device to another, in response to a request. It should be noted that this feature may require authorization of account administrator prior to use.

The video conference provider associates the audio stream of the pronunciation with the user of the first client device. For example, in addition to the audio stream of the pronunciation sent to the video conference provider, the application or first client device may include information characterizing the user and the field that is being pronounced. The video conference provider may persistently store the audio stream of the pronunciation in a suitable memory device, indexed to the information provided by the application or first client device.

As used herein, "field" refers to a labeled or categorized unit of text. The field is characterized by a label, category, or key and contains a value. For example, a name field is labeled with "name" and contains a name value. An example name field value may be "Mary Smith." Another example field may a city field. The field key could be "City" and the value, in one instance, could be "New York City."

In this example, a plurality of participants using a plurality of client devices then join a video conference hosted by the video conference provider, including the first client device. During the video conference, one of the participants using a second client device may want to know or learn how to pronounce the user of the first client device's name. For instance, the participant may have forgotten the correct pronunciation, may not have heard it, may want to be reminded, or for any number of other reasons may desire to hear the audio stream of the name pronunciation of the user of the first client device.

The participant may use an application provided by the second client device to indicate a desire to play back the recording. For example, a profile application may be accessible during the video conference. It may be included, for example, in the context menu provided when the participant clicks on the icon or image of the user of the first client device. The participant may click on an appropriate control to activate the profile application for the user of the first client device and a corresponding playback button or other suitable user interface control. The profile application generates a first indication including a message requesting the audio stream associated specified by information that characterizes the user of the first client device.

The video conference provider receives the first indication to play back the pronunciation from the profile application of the second client device of the participant. Responsive to the first indication, the video conference provider then retrieves, from a memory device, the audio stream of the pronunciation made by the user of the first client device and streams it to the second client device. The video conference provider then outputs instructions to cause the second client device to play back the audio stream of the pronunciation.

In some embodiments, the first indication includes a message from a voice recording application. The voice recording application provides a user interface for making, editing, updating, and deleting recordings to generate audio streams. The voice recording application may be a stand-alone application accessible through a menu on the client device or may be incorporated/embedded into another application, like the video conferencing application. The message may include information relating to a request to retrieve information about a specified user, for instance, recordings made by the user of the first client device. As with the profile application, the message may include information associated with the desired user and fields. The video conference provider can retrieve and stream the requested audio stream, which can be played back using the voice recording application. Thus, the voice recording application can be used for both recording and playing back audio. For instance, an audio stream can be generated on a first client device and played back on a second client device. In some examples, the voice recording application can be used to record a pronunciation before a video conference begins. For instance, while the user of the client device waits to join the conference in a "waiting room," they may record their name or other useful detail. Then, after joining the conference, other participants may use the voice recording application to play back the recording.

In some embodiments, the first indication includes a message from a voice capture application. The voice capture application provides a user interface for making, editing, updating, and deleting recordings of other participants during a video conference. The voice recording application may be incorporated/embedded into another application, like the video conferencing application. The message may include information relating to a request to retrieve information about a specified user, for instance, recordings made by the user of the first client device. As with the profile application, the message may include information associated with the desired user and fields.

For example, during a video conference, the video conference provider may receive an indication from a second user of a second client device to capture the audio stream of the pronunciation of the one or more words spoken by the first user using the voice capture application. The video conference provider receives the captured audio stream of the pronunciation of the one or more words spoken by the first user. Later, the video conference provider receives second indication to play back the captured audio stream from the second user, to remind him or her of how to pronounce the name of the first user. Responsive to the second indication, the pronunciation recorded by the first user is played back on the second client device of the second user.

In some examples in which the first indication includes a message from a voice capture application, the video conference provider may determine a name of the user from the one or more words spoken by the user. For example, the video conference provider may include an audio stream processing component that can process the audio stream and identify words using a transcript and/or natural language processing ("NLP") technologies. Based on the identified name of the user, the video conference provider can automatically associate the one or more words spoken by the user with a profile of the user.

The innovations of the present disclosure provide significant improvements in the field of video conferencing technology. Wasted time, embarrassment, and frustration relating to mispronounced names contribute to a loss of efficiency while using video conferencing platforms, and thus ultimately to losses in revenue. Using the techniques described herein to provide pronunciation services available before, during, and outside of the video conferencing context, the accurate pronunciation of names and other words with cultural, ethnic, and social importance can be ensured using a technological solution. Moreover, technology to help to ensure the correct pronunciation of names will protect corporate interests by reducing the likelihood of cross-cultural mistakes or offenses.

Existing technologies for name pronunciation services may include expensive or amateur pre-recorded pronunciations or machine-pronounced names. Pre-recorded pronunciations may not even be correct and are unlikely to provide complete coverage of the diversity of names and other words likely to be encountered in a global, remote workforce. For similar reasons, machine pronunciation is only as good as it is programmed to be and is limited in its ability to capture personal preferences, dialects, or variations, much less achieve complete linguistic coverage. The techniques disclosed herein obviate the need for such ineffective solutions and provide a new paradigm for name pronunciation services for video conferencing. Users can now record their name exactly as desired and persistently associate it with themselves, eliminating the need for expense and the risk of incorrection pronunciations. Users can likewise capture the pronunciations of others, with similar guarantees, a capability absent from the art until now.

These illustrative examples are given to introduce the reader to the general subject matter discussed herein and the disclosure is not limited to these examples. The following sections describe various additional non-limiting examples and examples of systems and methods for pronunciation services for video conferencing.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
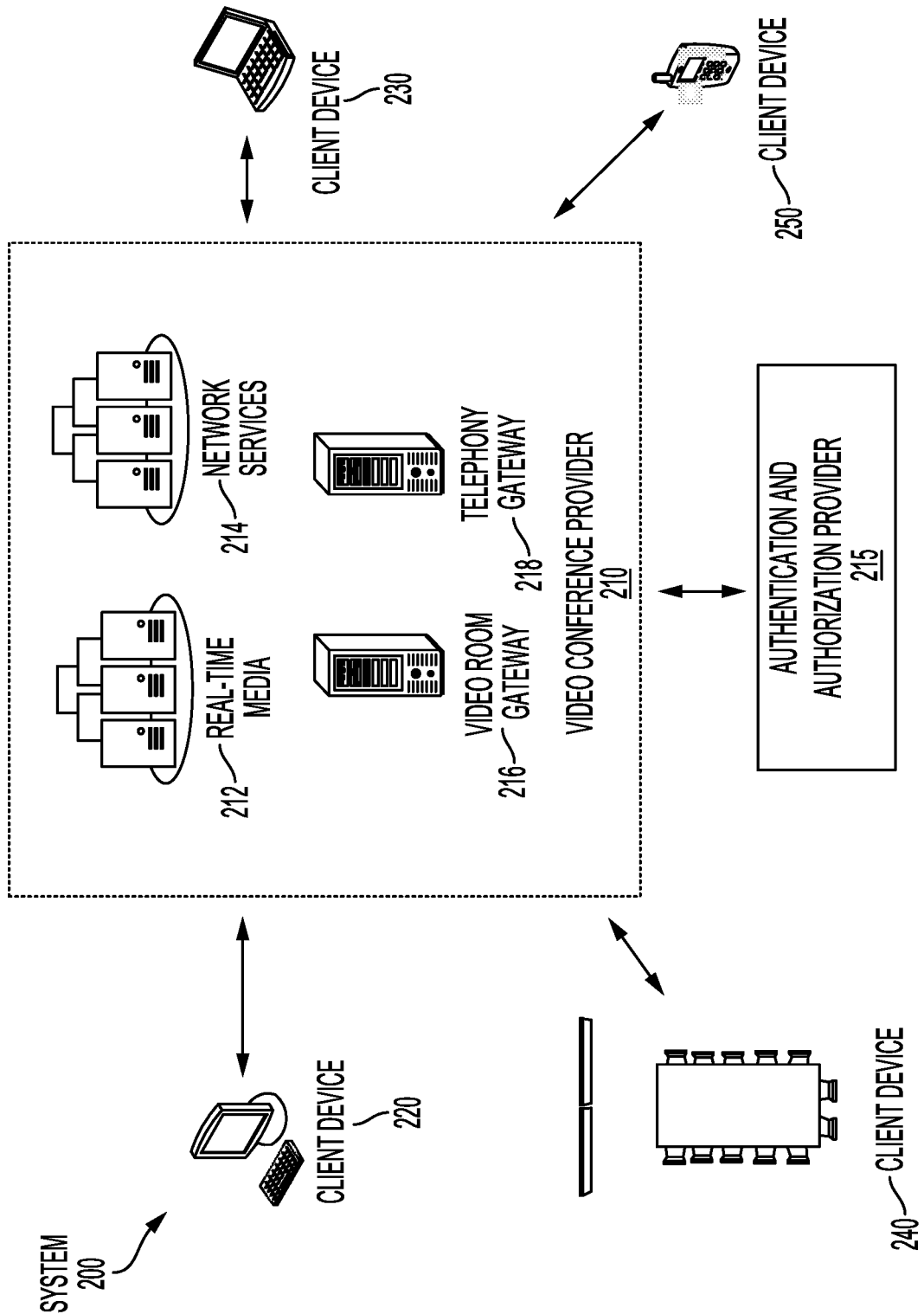
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider

210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
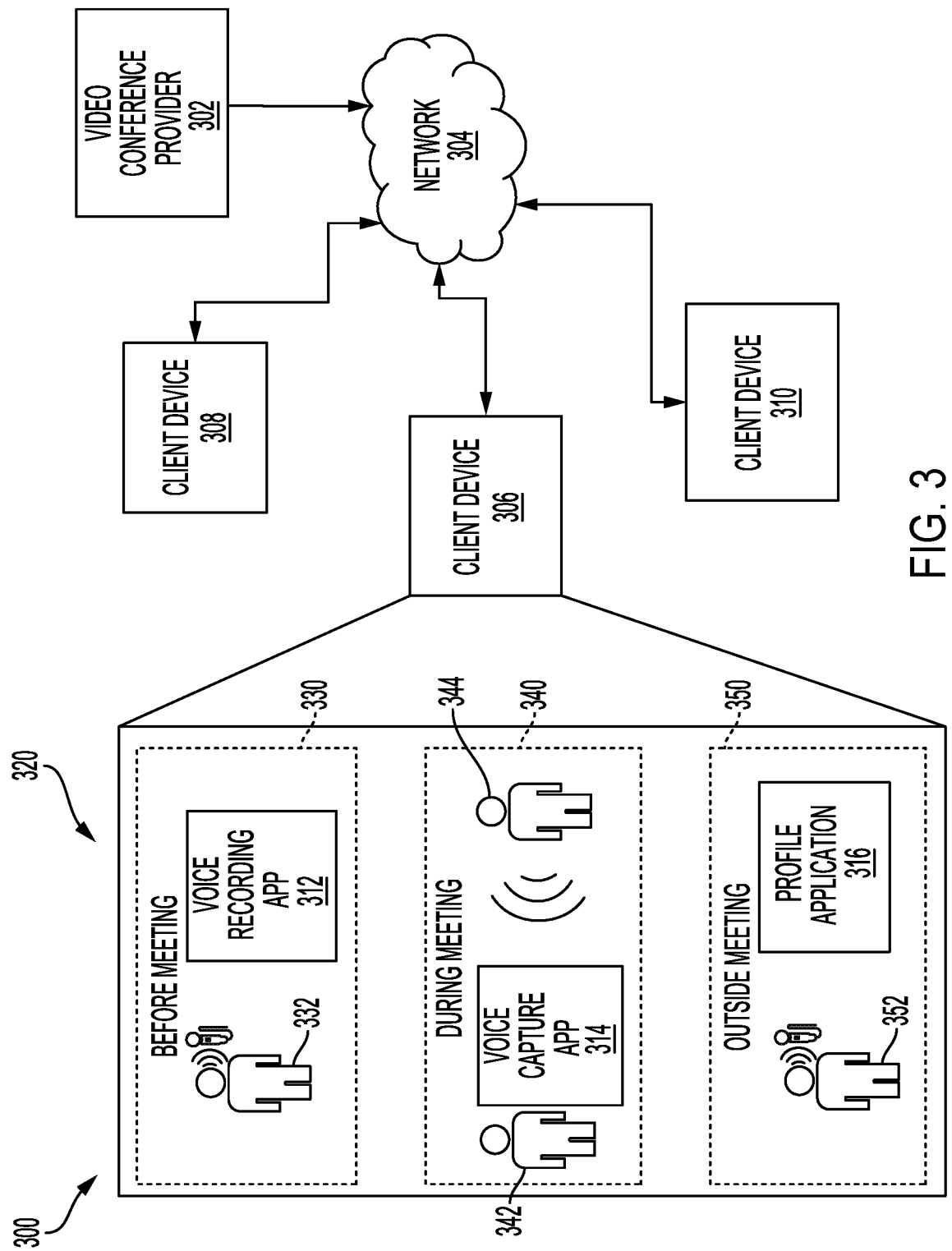
FIG. 3 shows an example of a system for pronunciation services for video conferencing, according to some aspects of the present disclosure.

Referring now to FIG. 3, FIG. 3 shows an example of a system 300 for pronunciation services for video conferencing, according to some aspects of the present disclosure. One or more client devices 306, 308, 310 are communicatively coupled with a video conference provider 302. For example, the client devices 306, 308, 310 may be coupled to the video conference provider over a network 304. The network 304 can include public networks, private networks, the Internet, or any other suitable combination of networked devices. In some embodiments, the client devices 306, 308, 310 may be configured using point-to-point networking and may be directly communicatively coupled with each other.

In example system 300, the video conference provider 302 hosts a video conference with one or more participating client devices. In some examples, a single client device can start a video meeting with no other participants in order to create a recording. In another example, a plurality of client devices may join together to participate in a video conference simultaneously. A video conference may include the video streams of each participant being sent from each respective client device to the video conference provider and then to the client devices of the remaining participants. For example, example system 300 depicts three client devices 306, 308, 310 that may be participants in a video conference.

In addition to a video stream, the video conference may include one or more audio streams. An audio stream may include the audio captured by an audio input device for one or more participants. The audio stream may be sent by the client devices 306, 308, 310 to the video conference provider 302 over the network 304. The video conference provider 302 may then send the audio stream to the other participants for playback. Some example embodiments may utilize a point-to-point connection approach in which the audio stream may be sent directly from one client device to another over the network 304.

Turning now to a particular client device 306, the client device 306 may be a personal computer, laptop, smartphone, tablet, or similar device. The client device 306 can receive audio input for pronunciation recordings through a microphone or by capturing a portion of an audio stream received from an external source. Other sources of audio input are possible. For instance, a recording of a pronunciation may be obtained through a saved file or from an internet link (e.g., a uniform resource locator ("URL") pointing to an audio stream at a network location). The audio stream of pronunciations is obtained by client device 306 using one or more applications, which can then temporarily or persistently store the audio stream in anticipation of future playback requests by the user of client device 306 or other users/client devices.

Client device 306 can allow the user to record or capture a name pronunciation at different times with respect to a video conference using different client device 306 functionalities. The illustration in FIG. 3 includes inset 320 that illustrates some example functionalities for providing pronunciation services for video conferencing. Example users 332, 342, 352 are depicted using some examples of systems and methods for pronunciation services for video conferencing. Box 330 shows user 332 making a recording of a pronunciation before a meeting using voice recording application 312. In some examples, voice recording application 312 is accessible while preparing to join the meeting, for instance, from a configuration page, settings page, calendar invite, and so on. In some other examples, voice recording application 312 is accessed while wait to join a meeting. For instance, a user interface for using voice recording application 312 may be provided while user 332 is in the waiting room, waiting for the host to grant access to the meeting.

Box 340 shows user 342 using voice capture application 314 to record the pronunciation of words spoken by participant 344 during a video conference. For example, during a video conference, user 342 may encounter another participant for whom they want to ensure that they pronounce their name, company name, product, etc. correctly. The user 342 can use voice capture application to record the pronunciation of one or more words, as spoken by the participant 344, and then associate those pronunciations with the participant 344. The pronunciations can then be played back using one or more user interface controls or applications provided by the video conferencing subsystem. The pronunciations can be persistently associated with the participant 344 such that they are available even after the video conference has ended. In some examples, a video capture application may be used to record video of the speaker's lips so that the video recording of the lip movement, along with the audio recording of the pronunciation, can be used together to know or learn how to accurately pronounce names at a later time.

Box 350 shows user 352 recording a pronunciation outside the context of a video conference using, for example, a profile application 316. For example, a user may record the pronunciation of their name using a user interface provided by profile application 316. Information including the audio stream of the pronunciation may be sent to the video conference provider 302 and associated with the user. The profile application 316 may be used by other users with access to the video conference provider 302 to look up information about user 352, including the audio stream of the accurate pronunciation of the user's 352 name. In some examples, the profile application may be accessible during a video conference, for instance, through a context menu linked to the user's 352 icon or image. The profile application 316 may be a contacts application, an address book application, user account information page, settings or configuration page, and so on.

Figure 4:
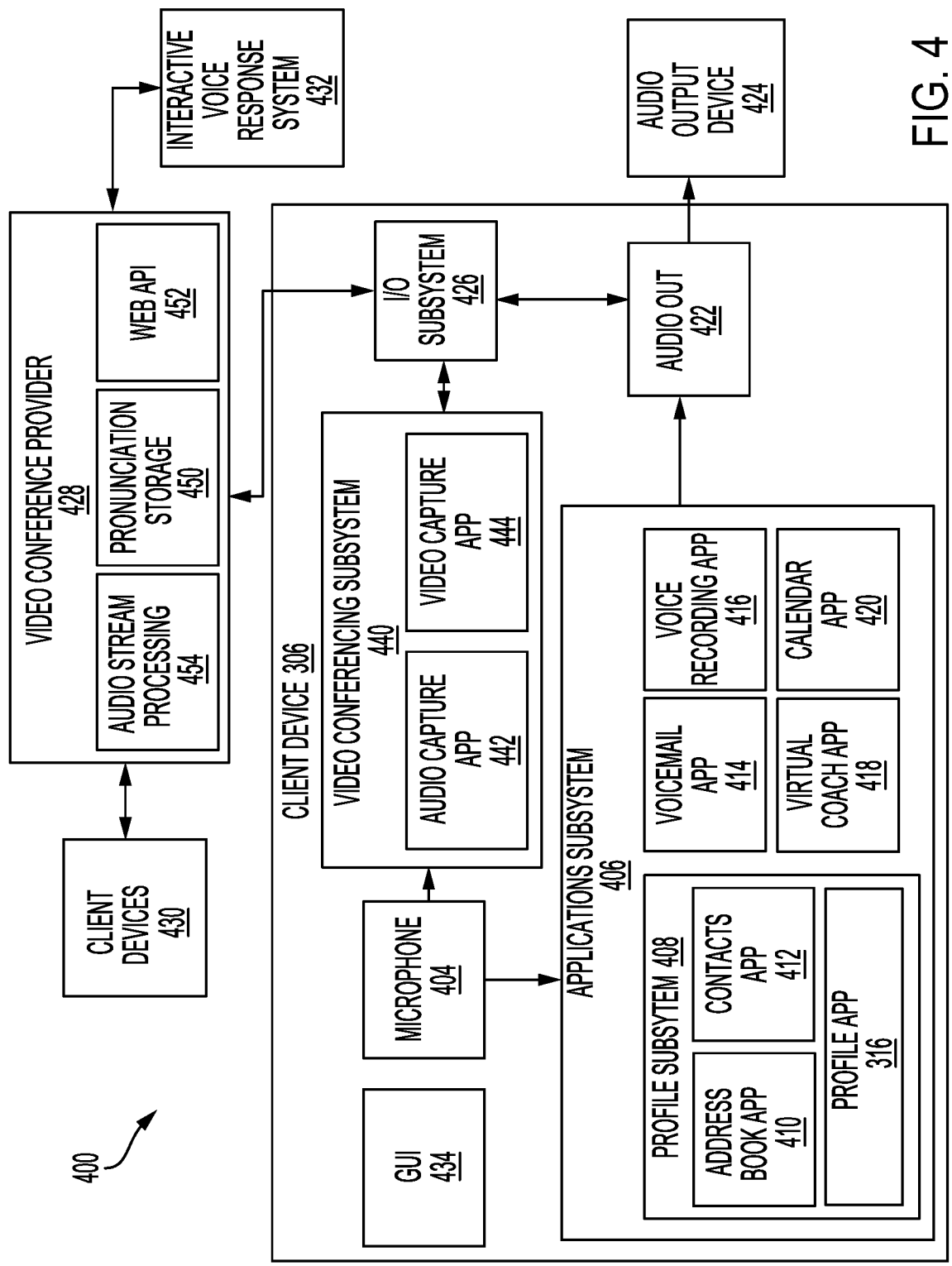
FIG. 4 shows an example of a system for pronunciation services for video conferencing, according to some aspects of the present disclosure.

Referring now to FIG. 4, FIG. 4 shows an example of a system 400 for pronunciation services for video conferencing, according to some aspects of the present disclosure. System 400 depicts an example implementation of client device 306. The subsystems and components making up the client device 306 described herein may be implemented as hardware, software, or both. In some examples, some components included in client device 306 may be hosted in other devices or remote servers. For example, components or applications included in the application subsystem 406 may be installed on client device 306 or may be hosted in a remote server and accessed through a web browser. Configurations and user interfaces relating to pronunciation services for video conferencing can be viewed and input using client device 306 by way of a graphical user interface (GUI) 434. The GUI 434 may be displayed on a personal computer screen, smartphone screen, tablet screen, or the like. Example user interfaces are depicted in FIGS. 5A-D.

The client device 306 can join a video conference hosted by video conference provider 428. The video conference may have one or more participants, including the user of the client device 306. Some video conferences may have a plurality of participants using a plurality of client devices 430. The video conference provider 428 may be similar to the video conference provider 110, 210 described in FIGS. 1 and 2. The components of the video conference provider 428 may be implemented as hardware, software, or both. The video conference provider 428 may be used for planning, hosting, coordination of, and securing video conferences among a plurality of participants, among other functions. The video conference provider 428 receives audio and video streams corresponding to ongoing video conferences from client device 306 and relays it to the client devices 430 of the other video conference participants for playback.

Recording of the audio stream of the client device 306 begins with a microphone 404. Any suitable type of internal or external microphone 404 for capture of audio information may be used. For example, the microphone 404 may be a built-in microphone included as part of the hardware making up the client device 306. Some example client devices may have multiple microphones or microphones with multiple audio channels for recording multiple audio streams simultaneously.

The recorded audio stream is sent to the applications subsystem 406 and video conferencing subsystem 440. Video conferencing functions on client device 306 are provided by video conferencing subsystem 440. A video conference can include one or more video streams and one or more audio streams. The user of the client device 306 may have an associated video stream and audio stream, both of which can be selectively enabled or disabled. The video and audio streams are sent to the video conference provider 428 by way of the I/O subsystem 426. Likewise, each of the other client devices 430 that are participating in the video conference may have a video stream and an audio stream that can be selectively enabled or disabled. The video and audio streams of the client devices 430 are sent to the video conference provider 428 and then provided to the client device 306 by way of the I/O subsystem 426 for display and playback on client device 306. FIG. 5B depicts a typical user interface showing the video streams of the various other users of client devices 430 during a video conference.

Because audio and video stream can be selectively enabled or disabled, it is possible to single out one video and/or audio stream for capture of pronunciation and associated video. Video conferencing subsystem 440 includes audio capture application 442 and video capture application 444. Audio capture application 442 includes, among other things, components for recording audio associated with specific participant, including audio capture application 442. So, for a video conference including a user of client device 306 and 3 other participants, the user can use audio capture application 442 to selectively record words spoken by each of the 3 other participants such that the recorded audio will only contain the spoken word of the target participant.

In certain embodiments, audio capture application 442 can be used to record a pronunciation in response to an action performed by the user of the client device. For example, the user can begin a recording by pushing an appropriate "Record" button. In some embodiments, the audio capture application 442 may be configured to automatically extract pronunciations of certain words from completed video. For example, can receive near real-time transcription of the video conference as it progresses from the video conference provider 428. The audio capture application 442 may be configured, based on commands from the video conference provider 428, to make recordings of a certain pronounced words designated in the transcript. This operation may take place on the video conference provider 428 as well, since both the transcript and recording of the video conference may be available there as well. Automated extraction of pronunciation information from recorded video conferences can be, but need not be, in real time.

Video capture application 444 includes facilities for capturing the video of a specific participant and optionally associating the video with recorded audio. For example, it may be desirable to obtain lip movement video recordings to supplement audio recordings of the pronunciation of certain words. Video capture application 444 can be used to identify a video stream, adjust a zoom level, pan a capture window, and so on.

Applications subsystem 406 includes a suite of applications implemented using one or more application programming interfaces ("APIs") of the client device 306 for performing various operations relating to video conferencing and other technology areas. Several example applications will be discussed, but this enumeration is non-limiting. Application subsystem 406 can have other applications relating to pronunciation services for video conferencing, including third-party applications downloaded from a marketplace application or obtained from the Internet. In general, recorded pronunciations can be obtained during any suitable context, and can be subsequently received from the video conference provider 428 via the web API 452 as needed. Several example applications are shown in FIG. 4, but other applications may incorporate recorded name or other word pronunciations.

The application subsystem 406 includes a profile subsystem 408 that includes at least an address book application 410 and a contacts application 412. For instance, the profile application 316 may be one of the components included in the profile subsystem 408. The profile subsystem 408 may include a related set of components for creating, querying, reading, updating, and deleting user profile information or other information about users. User profile refers to the set of information stored locally on the client device 306 and/or by video conference provider 428 about each particular user. Components of the profile subsystem 408 can access profile data stored by video conference provider 428 though web API 452, as described below.

Address book application 410 may contain summary information about users for connecting through applications provided by the client device 306. For example, a typical address book application 410 may be populated with corporate name, phone, and email data to facilitate ready communication among employees in the enterprise setting. In contrast, the contacts application 412 may include a variety of information, including demographic data, location data, graphical data, and so on. Entries in the contacts application 412 may be curated by the user of the client device 306. The profile application 316 may include similar information about the user themself. The profile application 316 may be a standalone application or may be included with a user account page or configuration or settings page.

In all three cases, as with other components that may be included in the profile subsystem 408, pronunciation information may be associated with user entries. For example, the accurate pronunciation of a particular user's name may be associated with their entry in either the address book application 410, the contacts application 412, or the profile application 316. In some examples, separate recordings may be used for first, middle, last, or other sub- or super-sets of names. The components of the profile subsystem 408 may provide tools for recording pronunciations as well as for playing back pronunciations of the names and other spoken words of other users. In some examples, voice recording application 416, may be used to implement the recording and playback functionality of the audio functionality of the profile subsystem 408. The pronunciations can be associated with profile entries manually by the user of the client device 306 or at the group or organization level by, for example, the administrator of the video conference provider 428.

Recorded name pronunciations may be used with a voicemail application 414. For example, for client devices that include a telephonic function, the voicemail application 414 can be used to create a voicemail message using recorded pronunciations. If a user with the name "Mary Smith" is associated with a persisted name recording and has not manually created a voicemail message, the voicemail application 414 can be configured to automatically create a default voicemail message using the recording, which will include the correctly pronounced name by substituting the persisted name recording for a default or machine-generated pronunciation. For instance, a message can be automatically generated that says, "You have reached the voice mailbox of Mary Smith, please leave a message," in which all of the message is pre-recorded by a voice actor or machine-generated except for the name, which is populated/dubbed using the recorded name pronunciation for user Mary Smith.

Applications subsystem 406 includes voice recording application 416. Voice recording application 416 can be used to create, playback, edit, and delete voice recordings. For example, voice recording application 416 can be used to record the pronunciations of names and other fields that may vary according to language, ethnicity, or culture. Voice recording application 416 may be a standalone application or may be embedded in other applications. For example, voice recording application 416 may be used during video conferences by the video conferencing subsystem 440 for playback of audio information obtained from other applications including the audio capture application 442.

Voice recording application 416 may use local storage of recordings. In some implementations, recordings may be stored on remote servers included in video conference provider 328, as well as in cloud storage locations, like a cloud storage provider. Recordings may be periodically synced between local and remote storage.

Voice recording application 416 may include audio editing tools. For example, voice recording application 416 may include program code for cut, copy, paste, and delete of all or portions of audio tracks, looping, scrubbing, enhancing, adjusting tone or intensity, slowing/speeding, among other capabilities. In some examples, the capabilities of the voice recording application 416 may be provided by a third-party application or plugin.

A virtual coaching application 418 may be provided as a component of application subsystem 406. The virtual coaching application 418 includes a name pronunciation practice program that can be used by users to practice pronouncing stored names and other fields. For example, virtual coaching application 418 may include program code for comparing user pronunciation of names against the saved pronunciations. In some examples, the user's lip movement can also be compared against stored lip movement used saved video recordings. The pronunciations and lip movement evaluations can be scored and virtual coaching application 418 may highlight areas that need improvement and suggest techniques for achieving the optimal pronunciation so that users will be prepared to properly pronounce the name.

A calendar application 420 may be included in some example application subsystems 406. Calendar application 420 includes information about upcoming events, webinars, and/or meetings, which can include participant lists. The organizer of such events may wish to review or practice pronunciations before the event. In some examples, the voice recording application 416 may be used by the calendar application 420 for playback of recorded pronunciations from the user interface of the calendar application 420. For example, the organizer of an event may use the calendar application 420 to plan for and prepare for an upcoming event. Part of that preparation may include playback of the recordings of pronounced terms to ensure that they are correctly pronounced during the event, reducing frustration and embarrassment, and improving the effectiveness of the video conference.

Pronounced names and other audio streams are sent to the Audio out 422 for playback. Audio out 422 is configured for playback of audio streams over one or more audio output devices 424. Audio output devices 424 may include speakers and/or headphones. Speakers may include a variety of speaker types and configurations. For example, speakers may include various dynamic ranges, including, for example, midrange speakers, woofers, tweeters, subwoofers, and the like. Speakers may be constructed according to one or more audio projection technologies including dynamic speaker construction, horn speaker construction, electrostatic speaker construction, and planar-magnetic speaker construction, among others. Various types of headphones may be used in different embodiments including closed-back headphones, open-back headphones, on-ear headphones, over-ear headphones, in-ear headphones, earbuds, Bluetooth headphones, and noise-cancelling headphones, among others. These examples of audio input and output hardware are non-limiting and a person having skill in the art will recognize that a large variety of audio hardware may be used for both capturing audio and playing back audio.

Outgoing audio is sent to the I/O subsystem 426 from the Audio out 422 and from the video conferencing subsystem 440, along with other data and telemetry relating to video conferences and other applications, subsystems, and components. I/O subsystem 426 sends audio and video streams to remote servers including video conference provider 328. For example, I/O subsystem 426 may send and receive data from video conference provider 328 using web API 452. In addition to data received based on direct queries, I/O subsystem 426 may receive data from external applications over webhooks, internal APIs, socket communications, Hypertext Transfer Protocol ("HTTP") sessions, Transmission Control Protocol ("TCP") connections, or other suitable protocols.

Some information used by the various components of the client device 306 are sent and received by the video conference provider 428. Video conference provider 428 includes components for processing and storage of recorded pronunciations. Pronunciation storage 450 can be used for persistent storage of pronunciation recordings made with, for example, audio capture application 442, voice recording application 416, or applications from profile subsystem 408, among others. Pronunciation storage 450 may include a database hosted by a video conference provider 428 or may use a cloud storage provider. For example, Pronunciation storage 450 may be a relational database that can be queried or updated using structured query language ("SQL") queries. In some examples, the Pronunciation storage 450 may include a document-based database that can store audio recorded binary objects along suitable description and metadata for indexing. Other storage configurations are possible including, for example, file- or disk-based storage or cloud storage. The pronunciations stored by Pronunciation storage 450 may be accessed through web API 452.

Web API 452 receives queries and data from client devices 306, 430 or third-party applications. For example, the web API 452 may be used to receive audio and video streams from client devices 306, 430. The web API 452 may use REST, simple object access protocol ("SOAP"), Graph Query Language ("GraphQL"), remote method invocation, or other suitable implementation for sending and receiving data from client devices 306, 430 or other third-party applications.

An audio stream processing 454 is used by video conference provider 428 for performing post-recording processing of audio streams necessary for the accurate and effective playback of pronunciations and other related tasks adjunct to the techniques described herein. For instance, audio stream processing 454 may include one or more audio stream processing algorithms for extraction of the name from the recording. The audio stream processing 454 may use a transcription of the video conference or name from the user's profile along with a transcription of the recording to match the desired pronunciation of the name to the participant's name automatically, cropping the desired pronunciation from the recording and persisting the cropped audio stream in the pronunciation storage 450.

In some examples, a machine learning model may be included in audio stream processing 454 to determine the portion of the audio recording that includes the desired name pronunciation or other audio editing tasks that can be automated. For example, a neural network could be trained using supervised training methods using a labeled audio recordings training data set containing pronounced names to correctly identify pronounced names in recorded audio. However, the machine learning model may be trained using any suitable supervised, semi-supervised, or unsupervised training technique.

Additionally, any suitable machine learning model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine learning models, such as AEGANs or variational AEGANs ("VAEGANs").

Video conference provider 428 may be communicatively coupled with an interactive voice response ("IVR") system 432. The IVR system 432 may be used by a contact center or other enterprise for, for example, automated routing and handling of incoming voice communications. Alternatively, an IVR system may be used for automated contacting of users over telephony systems for business, marketing, or social purposes. In many cases, IVR systems 432 may utilize pre-recorded or machine-generated voice audio for the automated portions of some calls. In some embodiments, the audio streams of name pronunciations may be obtained using an application of the client device 306 and associated with a user. The IVR system 432 may be associated with the video conferencing provider 428 and can receive pronunciation information to augment the pre-recorded or machine-generated voice audio. Additionally, administrators or other users of IVR systems 432 may use the audio streams of name pronunciations for learning or practicing of name pronunciations in a manner similar to that discussed above with respect to the virtual coaching application 418.

Turning next to FIGS. 5A-D, FIGS. 5A-D show illustrations of example GUIs that may be used with a system for pronunciation services for video conferencing. The example GUIs may be displayed, for example, on a screen included with client device 306. The example GUIs may include controls for adjusting configurations or settings or creating, playing, editing, or deleting pronunciations. Additionally, the example GUIs depicted herein and the method described below may require authorization of account administrator prior to use.

Figure 5A:
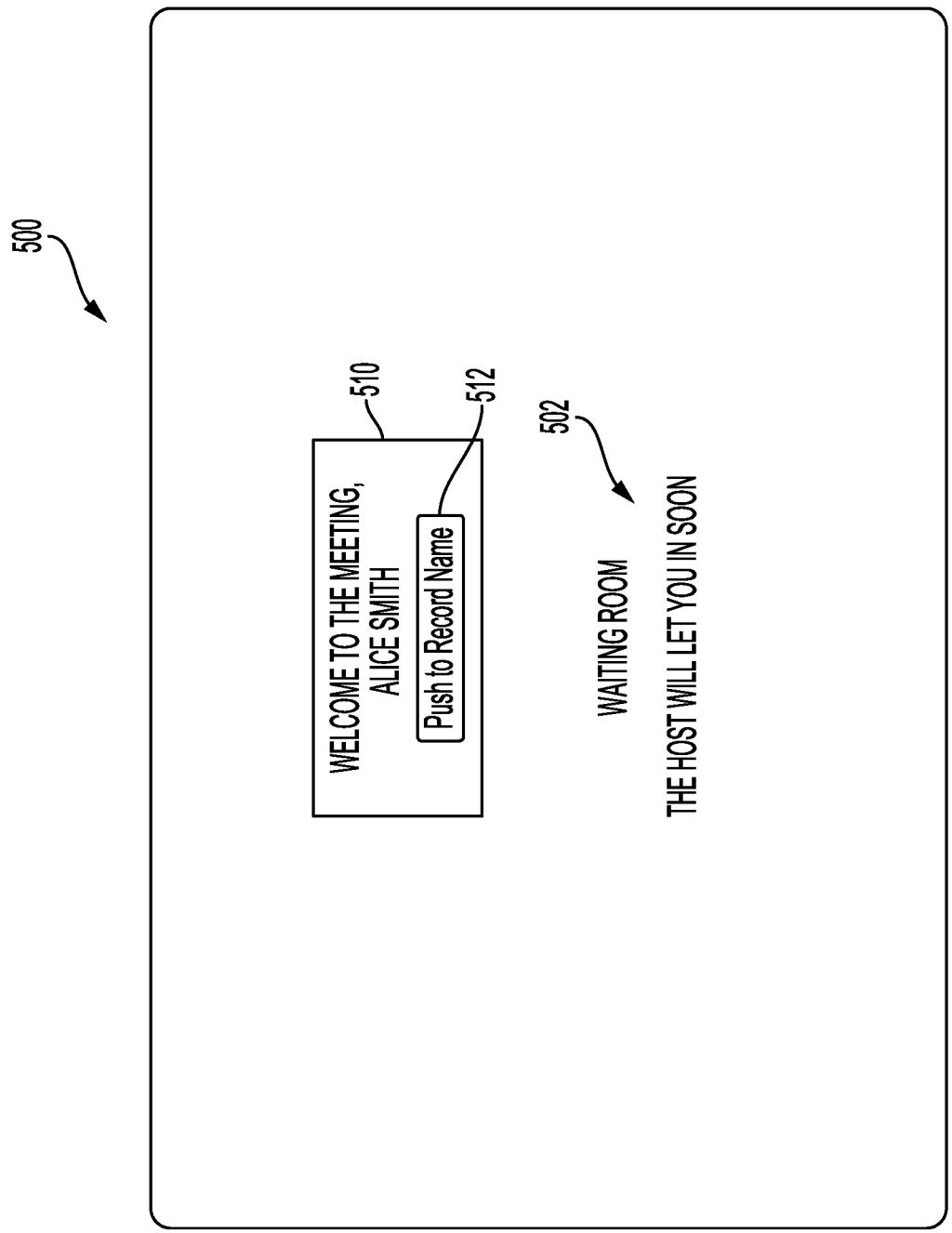
FIGS. 5A-D show illustrations of example GUIs that may be used with a system for pronunciation services for video conferencing.
Figure 5B:
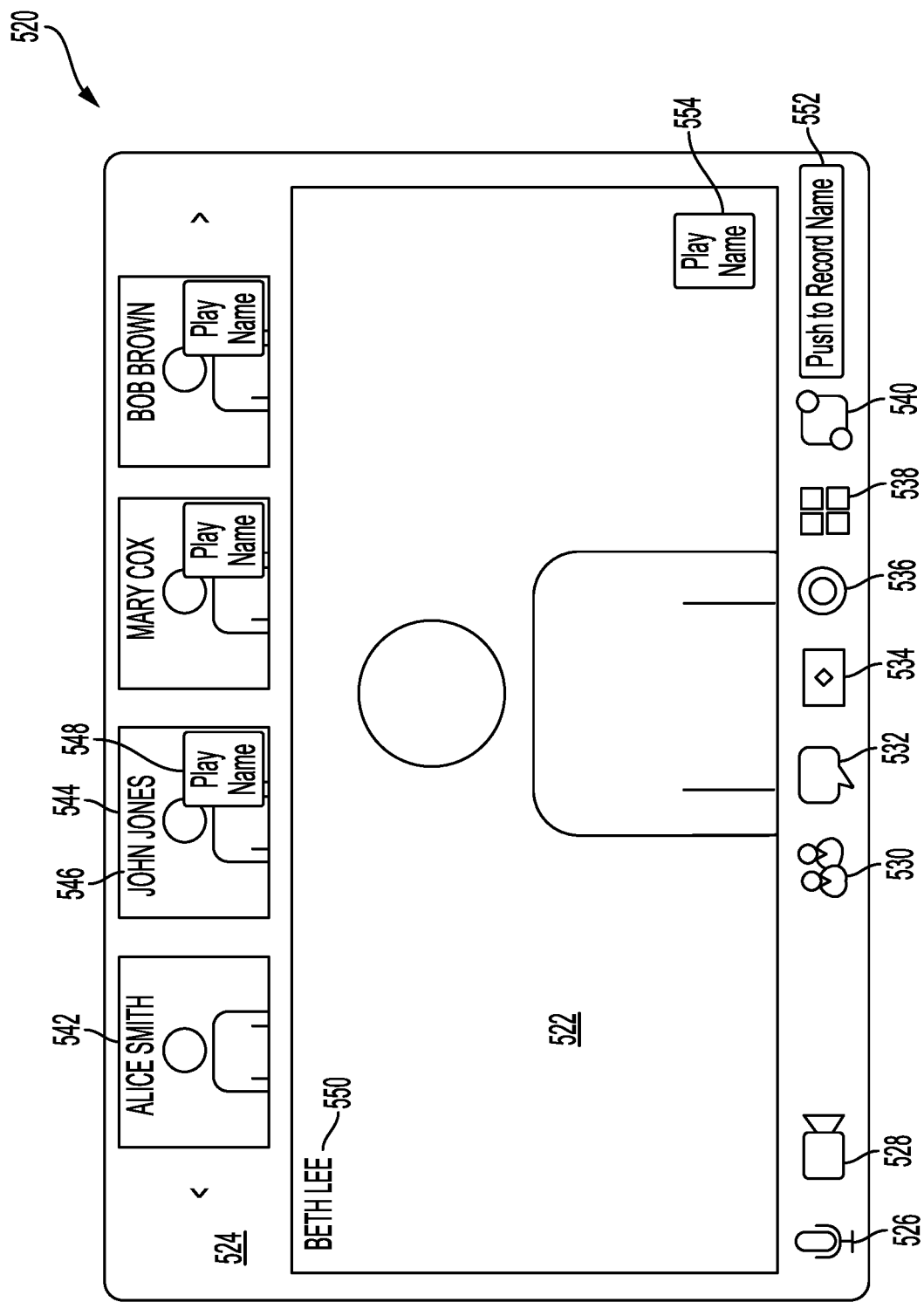

FIG. 5A depicts a user interface 500 that may be seen by a user of a client device 306 waiting to enter a meeting, sometimes called a "waiting room." The waiting room user interface 500 includes text 502 identifying the waiting room. In certain embodiments, the waiting room includes a user interface 510 for a voice recording application 416. The voice recording application user interface 510 may include a record button 512 for recording the pronunciation of the user's name. The voice recording application user interface 510 may include other controls (not shown) for stopping, re-recording, playing back, editing, deleting, etc. of the name pronunciation. After the recording is made, it is associated with the user who made it, either temporarily or persistently. For example, the client device 306 may be configured to associate pronunciations obtained at the beginnings of meetings solely for the duration of the meeting. In that case, during the meeting, the locally or remotely stored name pronunciation recording can be played back using an appropriate user interface for the voice recording application 416, which may then be deleted upon the conclusion of the meeting. In some other examples, a name pronunciation recording made at the beginning of a meeting can be persistently associated with the user profile of the user making the recording such that it is available for future uses by other applications and during subsequent meetings. For example, the playback of a persistently stored name pronunciation recording may be accomplished during a meeting using the voice recording application 416 or using a profile application included in the video conferencing subsystem 440.

Referring now to FIG. 5B, FIG. 5B shows an example GUI 520 for a software client that can interact with a virtual conference provider, such as virtual conference provider 328, to allow a user to connect to the virtual conference provider 328, chat with other users, or join virtual conferences. A client device, e.g., client device 306, executes a software client as discussed above, which in turn displays the GUI 520 on the client device's display. In this example, the GUI 520 includes a speaker view window 522 that presents the current speaker in the virtual conference. Above the speaker view window 522 are smaller participant windows 524, which allow the participant to view some of the other participants in the virtual conference, as well as controls ("<" and ">") to let the host scroll to view other participants in the virtual conference.

Beneath the speaker view window 522 are a number of interactive elements 526-540 to allow the participant to interact with the virtual conference software. Controls 526-528 may allow the participant to toggle on or off audio or video streams captured by a microphone or camera connected to the client device. Control 530 allows the participant to view any other participants in the virtual conference with the participant, while control 532 allows the participant to send text messages to other participants, whether to specific participants or to the entire meeting. Control 534 allows the participant to share content from their client device. Control 536 allows the participant toggle recording of the meeting, and control 538 allows the user to select an option to join a breakout room. Control 540 allows a user to launch an app within the virtual conferencing software, such as to access content to share with other participants in the virtual conference.

A user may interact with such a GUI 520 when their client software is operating in a normal configuration, such as while at home or in an office. Thus, the user has full control over their audio and video settings, can freely chat with other participants, and can use any suitable audio or video encoders to provide high quality audio and video streams to other participants in a virtual conference. However, in other scenarios, the GUI 520 may be restricted to only allow certain functionality or to disable certain functionality.

Participant windows 524 may include self-view 542, which displays the video stream of the user of the client device 306. Other smaller participant windows 544 may display the name 546 of participants. In some examples configured for pronunciation services for video conferencing, small participant window 544 may include a playback button 548 for participants who have recorded a name pronunciation and associated it with themselves. For example, the participant depicted in 544 may have recorded a name pronunciation prior to joining the video conferencing using the voice recording application 416 or previously using a profile application 318. Upon pushing the playback button 548, the recorded name pronunciation may be played back on client device 306 over audio output device 424. Similarly, speaker view window 522 may include a playback button 554 with similar functionality.

The GUI 520 may also include a record name button 552 for using the audio capture application 442 for recording the name and other pronounced details or fields. For example, prior to a participant introducing themself and accurately pronouncing their name, the record name button 552 may be clicked to begin recording. Once the recording is obtained, the GUI 520 may provide other controls (not shown) for editing, cropping, re-recording, playing back, or deleting of the name pronunciation.

Because serendipitous timing of the recording and editing of audio samples may lead to a poor user experience, in some examples, the audio capture application 442 may send the unedited recording to the video conference provider 328 to extract the pronounced name. The video conference provider 328 may include an audio stream processing 454 for extracting the desired portion of the audio recording. In some examples, the audio stream processing 454 of the video conference provider 328 can clip a plurality of pronunciation instances from one or more recorded audio streams. Audio stream processing 454 can then generate a composite pronunciation that combines elements of the plurality of recordings to produce a master pronunciation recording that may be superior to a single-track recording. For example, the master, composite pronunciation recording may be clearer, free of background noise or artifacts, or more effectively embody the accurate pronunciation as reflected in repeated recordings.

Figure 5C:
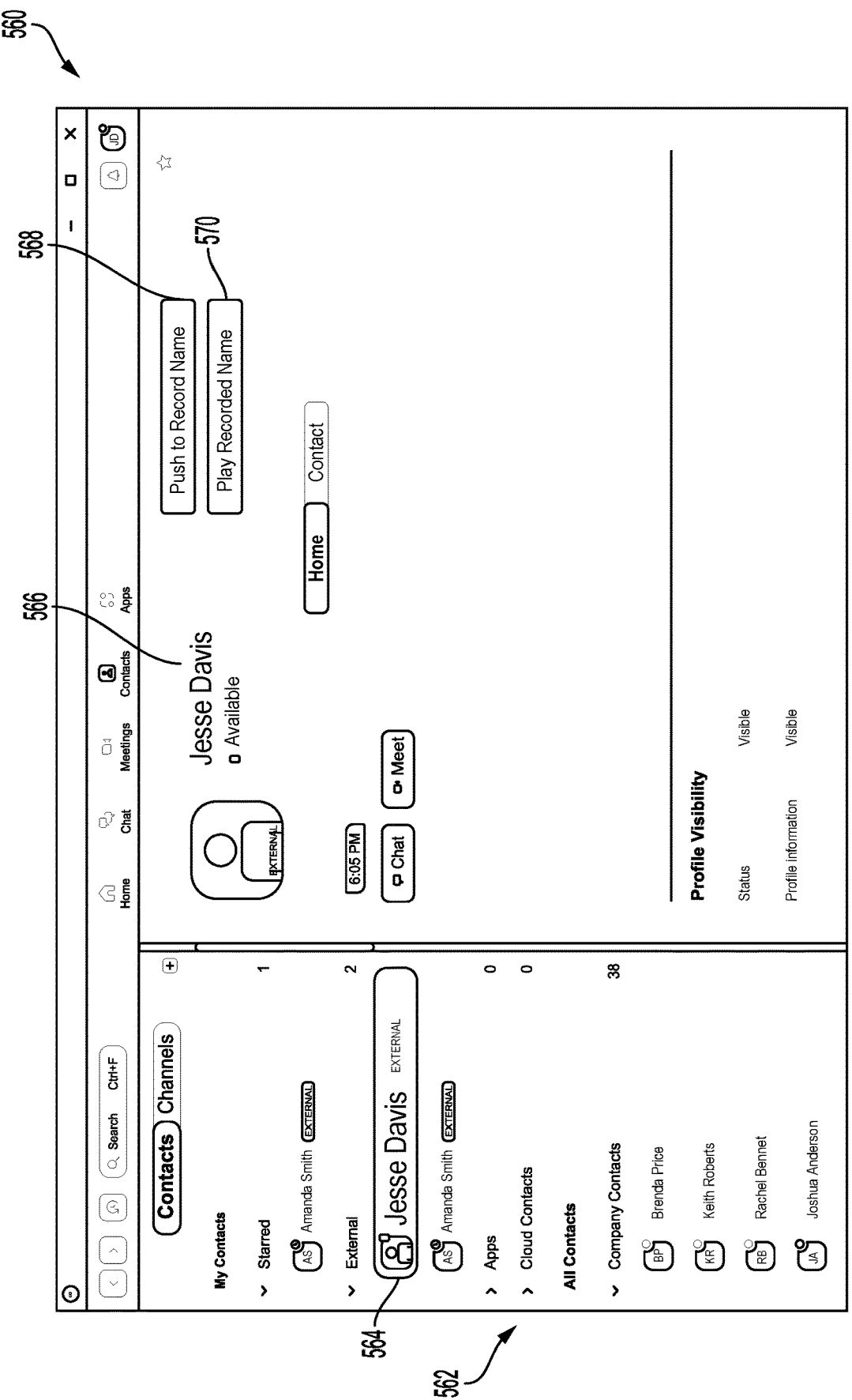

Turning now to FIG. 5C, FIG. 5C depicts an example contacts application 560, according to some aspects of the present disclosure. A list of contacts 562 may be displayed that can include various categorizations and/or groupings of contacts, according to the preferences of the user of client device 306. For instance, list 562 includes starred contacts, external contact, company contacts, and so on. One contact 564 may be selected to show additional detail. For example, the contact name 566 may be shown, along with other contact information including icons, photos, emails, etc.

The innovations of the present disclosure provide systems and methods for associating a recording of a pronunciation with certain words or phrases. For example, record button 568 can be used to record the pronunciation of the contact name 566. The user of client device 306 may learn of the correct pronunciation of a contact's name 566 and use button 568 to record the correct pronunciation. Use of the recording feature in this way is in contrast to capturing the pronunciation of the contact's name using the audio capture application 442 during a video conference. In both cases, however, a recording of a pronunciation is obtained and associated with a user, in this case, contact 564. Playback button 570 can be used to play back a recorded pronunciation associated with contact 564. Other controls (not shown) for editing, updating, re-recording, or deleting of the name pronunciation may be provided by contacts application 560. Pronunciations may be associated with other fields in addition to name. In some example contact applications, contact addresses, relationships, business associations, and other fields may be associated with a user. Such fields may include buttons similar to record button 568 and playback button 570 to provide similar functionality as that described with regard to contact name 566.

Figure 5D:
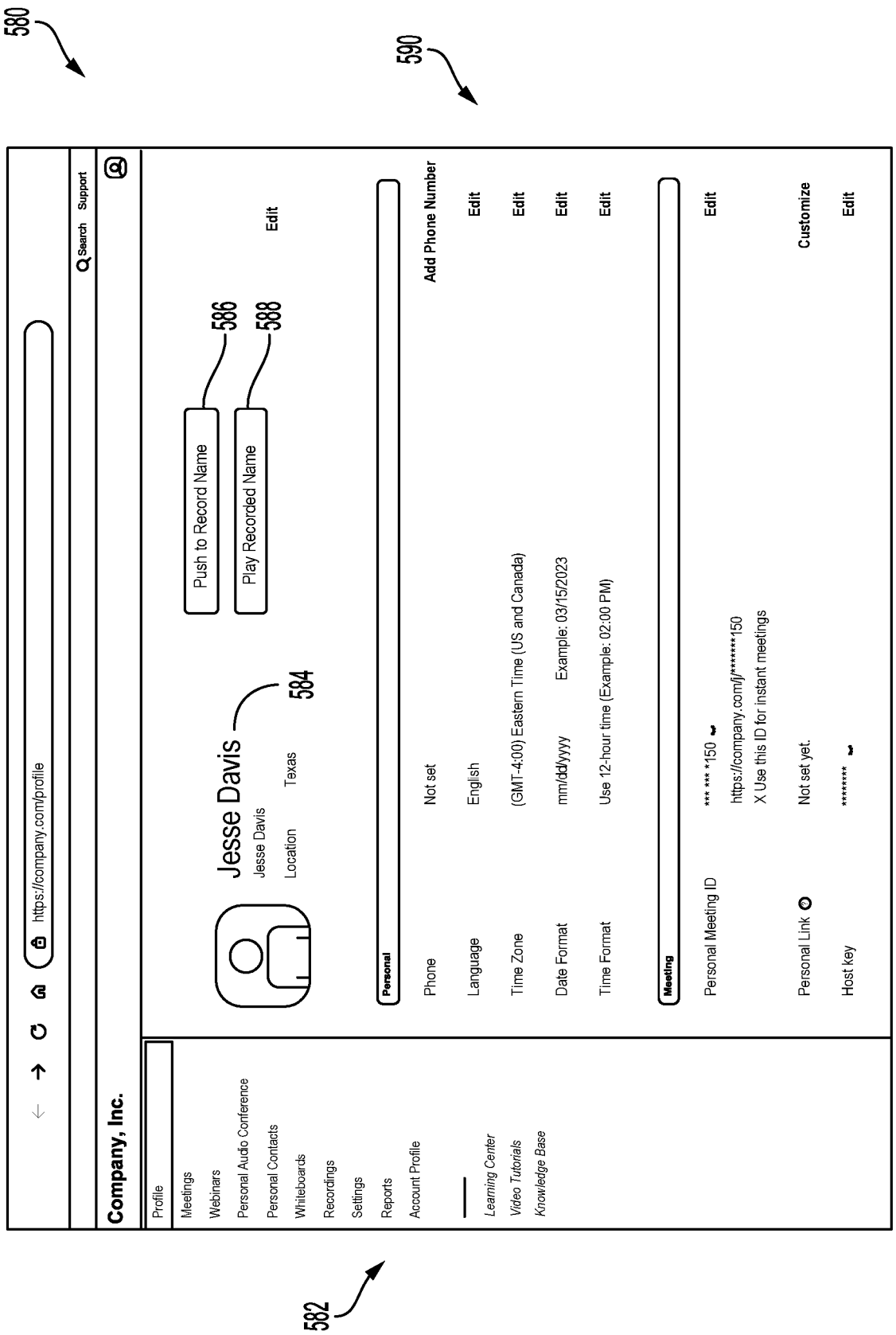

Turning now to FIG. 5D, FIG. 5D depicts an example profile application 580, according to some aspects of the present disclosure. In this example, the profile application 580 is found among other configuration pages 582 specific to a particular user, group, or organization. The profile application 580 may provide a variety of editable fields 590. Profile name 584 is an example field that may have an associated pronunciation. For example, record button 586 can be used to record the pronunciation of the profile name 584. Playback button 588 can be used to play back a recorded pronunciation associated with the profile. Other controls (not shown) for editing, updating, re-recording, or deleting of the name pronunciation may be provided by profile application 580. Use of profile application 580 provides users the capability to pronounce their own name and make the recording available to other users. In some examples, pronunciations of profile name 584 may be split into sub-recordings associated with first, middle, and last names. Pronunciations may be associated with other fields in addition to name. In some example profile applications, addresses, relationships, business associations, and other fields may be associated with a profile. Such fields may include buttons similar to record button 586 and playback button 588 to provide similar functionality as that described with regard to profile name 584.

Figure 6:
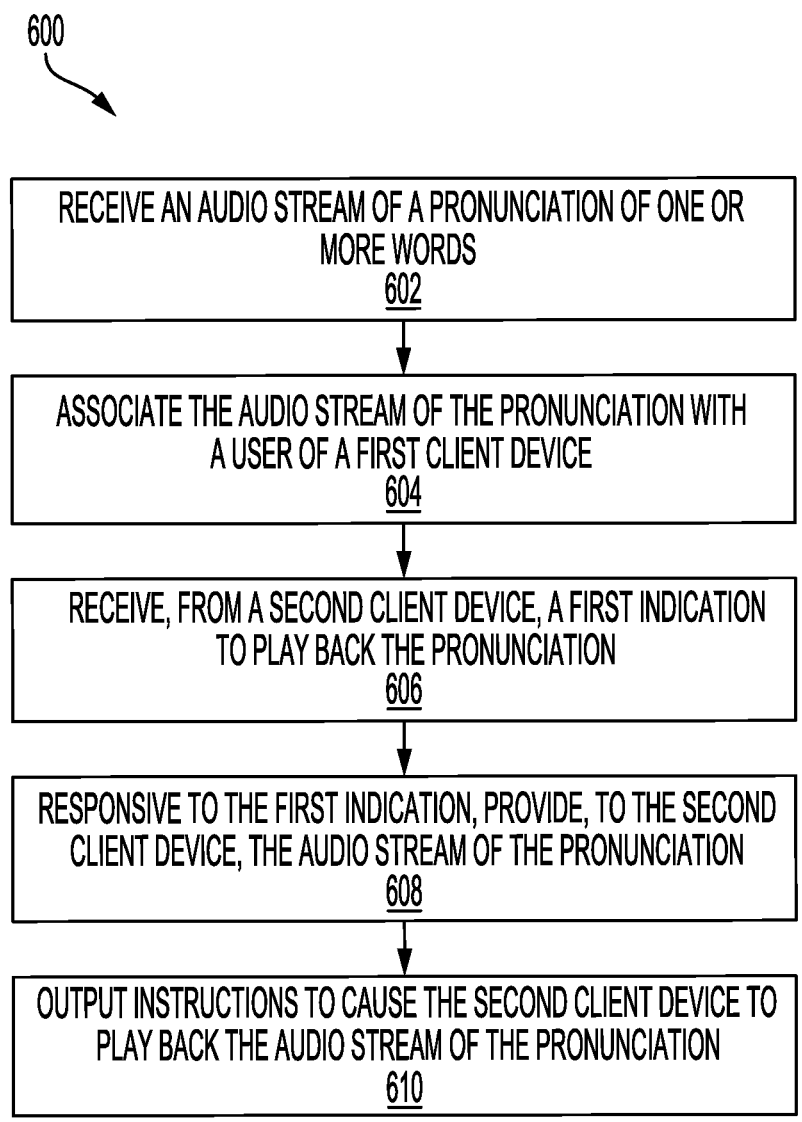
FIG. 6 shows a flowchart of an example method 600 for providing pronunciation services for video conferencing.

Referring now to FIG. 6, FIG. 6 shows a flowchart of an example method 600 for providing pronunciation services for video conferencing. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides a particular method for providing name pronunciation for video conferences. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For example, the description is given from the perspective of the video conference provider 428 but other configurations are possible. One of ordinary skill in the art would recognize many variations, modifications, and alternatives.

The method 600 may include block 602. At block 602, video conference provider 428 receives an audio stream of a pronunciation of one or more words. The one or more words may be captured by an application of the client device 306 and sent to the video conference provider 428. For example, the one or more words may be recorded using the voice recording application 416, the audio capture application 442, a feature of the profile subsystem 408, or other suitable application for voice recording.

The voice capture is received by the video conference provider 428 in the form of an audio stream. An audio stream may comprise any collection of audio data being sent from a source for eventual playback on one or more audio output devices. Thus, an audio stream from the client devices 430 of other video conference participants may be sent, for example, to multiple audio playback devices simultaneously. For instance, the audio stream from the client devices 430 may be sent to both speakers and headphones included among the audio output device 424 of the client device 306 for playback. The endpoint of an audio stream can be changed using a configuration operation provided, for example, by a suitable GUI.

Upon receipt, the video conference provider 428 may perform processing of the received audio stream using audio stream processing 454. For example, the audio stream may be truncated to correspond to a specific name or other word, based on an input like a transcript of a video conference. The received audio stream can be stored in the Pronunciation storage 450 for later use by applications of the client device 306, accessible through query to web API 452.

In some examples, the audio stream of a pronunciation of one or more words is received by a client device, from another client device. For instance, the one or more words may be recorded using the voice recording application 416, the audio capture application 442, a feature of the profile subsystem 408, or other suitable application for voice recording. The client device 306 can persist the recording in a local memory device. During a video conference, in response to an indication received from another client device, the client device 306 can send the recording which can then be received by the requesting client device.

The method 600 may include block 604. At block 604, the video conference provider 428 associates the audio stream of the pronunciation with a user of a first client device. The first client device is configured to join a video conference hosted by a video conference provider, the video conference having a plurality of participants using a plurality of client devices. The video conference provider 428 may function generally as described above with respect to FIGS. 1-2. The video conference may have a plurality of participants using a plurality of client devices. As described with respect to FIGS. 1 and 2, the video conference includes a multiplexed collection of audio and video streams corresponding to each respective participant in the video conference. The client device 306 captures outgoing video and audio streams and sends them to the client devices 430 of the other participants via the video conference provider 428 or using point-to-point networking. Conversely, the client device 306 receives audio and video streams from each of the client devices 430 of the other video conference participants via the video conference provider 428 or using point-to-point networking.

The association of the audio stream of the pronunciation with a user of a first client device enables the use of the audio stream in a variety of contexts and applications. For example, the audio stream may be received in block 602 by video conference provider 428 and persistently stored in Pronunciation storage 450. In one example, Pronunciation storage 450 includes a SQL-based relational database in which binary audio recordings can be associated with a particular value for a given user. Thereafter, applications can query the video conference provider 428 via web API 452 using the particular value and access the audio stream of the pronunciation for use in applications like profile applications, voicemail, coaching, event-based applications, audio playback and capture applications, and so on. The client device 306 may provide an API for authoring of such applications that includes functions and methods for integrating name pronunciations into applications that perform the relevant web API 452 operations for the application developer, to seamlessly integrate name pronunciations into applications. Pronunciation storage 450 may also persistently store pronunciations of other words associated with a user. For example, the particular value associated with a user can be used along with additional values (e.g., foreign or secondary keys) to associate pronunciations of other fields or words like locations, nicknames, relationships, etc. with the user.

In some examples, the association of the audio stream of the pronunciation with a user of a first client device may be performed by another client device. For instance, when a recording is sent to a first client device in response to an indication received from a second client device, the second client device may make a local association of the received audio stream with the user of the first client device. The second client device may create an ephemeral cache or persisted lookup table to locally store received pronunciations and information about the sending users. The information may include sufficient detail to use the stored received pronunciation data in the same or later video conferences.

The method 600 may include block 606. At block 606, the video conference provider 428 may receive, from a second client device, a first indication to play back the pronunciation. The first indication may include a message prepared and sent by an application to the video conference provider 428. For example, the profile subsystem 408 may include a contacts application 412. The user of the second client device may use the contacts application 412 to look up a particular user expected to be present in an upcoming video conference. The user of the second client device may use a user interface element to indicate a desire to hear the name of the particular user pronounced from an audio output device 424. For instance, such a desire can be indicated using the example contacts user interface 560 and button similar to playback button 570. In some examples, when the name pronunciation is received and stored locally by the second client device, the first indication may come from the second device.

The message may use any suitable machine-readable format for providing the indication including, for example, JSON, XML, YAML, and so on. The message may include the particular value corresponding to the particular user as well as any additional values associated with the desired pronunciation. For example, different secondary values may be associated with full name, first name, last name, nickname, etc. One example message may include the particular value of a particular user and one or more secondary values specifying the pronunciations requested.

The method 600 may include block 608. At block 608, the video conference provider 428 may, responsive to the first indication, provide, to the second client device, the audio stream of the pronunciation. Upon receipt of the message included in the first indication, the video conference provider 428 may query the Pronunciation storage 450 for the requested data using the values (keys) included in the first indication. In the case where the name pronunciation is received and stored locally by the second client device, the audio stream may be provided from a first component of the second client device to a second component of the client device.

The method 600 may include block 610. At block 610, the video conference provider outputs instructions to cause the second client device to play back the audio stream of the pronunciation. For example, the audio stream may be sent to the second client device in response to a request to web API 452 or sent to a pre-established webhook, in any suitable format. The first indication, may, for example, include a specification of the desired format. In some examples, the audio may be continuously streamed over an open socket or ongoing network transaction. In other examples, the audio may be sent as a discrete binary file for download at the second client device. The audio stream is accompanied by instructions for the client device. For instance, the instructions may include a command to execute a program for audio stream playback, including, for example, the audio recording application 312. In some examples, the audio stream may be received at the I/O subsystem 426 and sent to the audio out 422 for playback on one or more audio output devices 424, according to information included in the output instructions. From the standpoint of the user of the second client device, the time delay between providing the first indication and playback of the audio stream of the pronunciation may be minimal.

Figure 7:
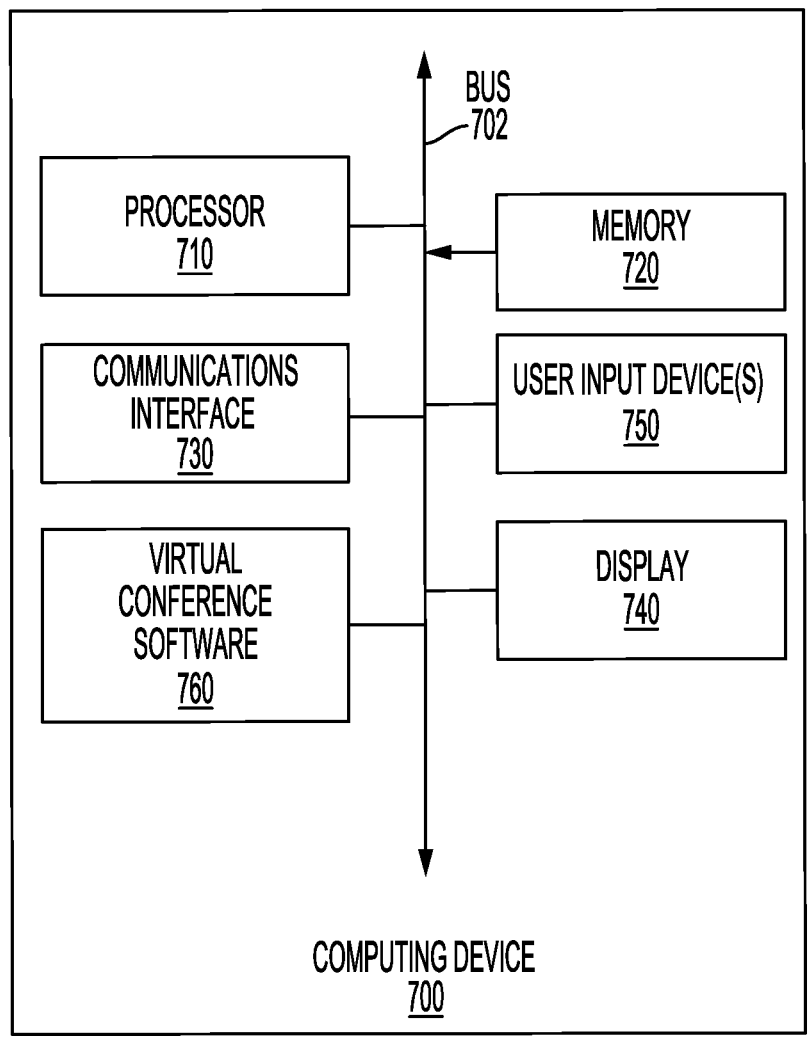
FIG. 7 shows an example computing device suitable for use in example systems or methods for providing pronunciation services for video conferencing, according to some aspects of the present disclosure.

Referring now to FIG. 7, FIG. 7 shows an example computing device 700 suitable for use in example systems or methods for providing pronunciation services for video conferencing according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for pronunciation services for video conferencing according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, from a first client device of a plurality of client devices, an audio stream of a pronunciation of one or more words, each of the plurality of client devices configured to join a video conference hosted by a video conference provider, the video conference having a plurality of participants using the plurality of client devices; associating the audio stream of the pronunciation with a user of the first client device; receiving, from a second client device of the plurality of client devices, a first indication to play back the pronunciation; responsive to the first indication, providing, to the second client device, the audio stream of the pronunciation; and outputting instructions to cause the second client device to play back the audio stream of the pronunciation.

Example 2 is the method of example(s) 1, wherein the first indication includes a message from a profile application of the second client device, the profile application comprising a profile of the user of the first client device.

Example 3 is the method of example(s) 1, further comprising receiving a plurality of indications corresponding to at least the first and second client devices joining the video conference, wherein the first indication includes a message from a profile application of the second client device, the profile application of the second client device comprising a profile of the user of the first client device, wherein the profile application of the second client device is caused to send the message during the video conference.

Example 4 is the method of example(s) 1, wherein the first indication includes a message from a voice recording application of the second client device, the voice recording application of the second client device comprising the audio stream of the pronunciation of the one or more words generated by the user of the first client device.

Example 5 is the method of example(s) 1, further comprising receiving a plurality of indications corresponding to at least the first and second client devices joining the video conference, wherein: the audio stream of the pronunciation of the one or more words is captured using a voice recording application of the first client device; and the first indication is an indication to play back the audio stream of the pronunciation using a voice recording application of the second client device during the video conference.

Example 6 is the method of example(s) 1, wherein the first indication includes a message from a voice capture application of the second client device, the voice capture application of the second client device comprising the audio stream of the pronunciation of the one or more words spoken by the user of the first client device and caused to be captured by another user.

Example 7 is the method of example(s) 1, further comprising: receiving a plurality of indications corresponding to at least the first and second client devices joining the video conference; receiving, from the second client device, a second indication to capture the audio stream of the pronunciation of the one or more words spoken by the user of the first client device using a voice capture application of the second client device during the video conference; receiving, from the first client device, a captured audio stream of the pronunciation of the one or more words spoken by the user of the first client device; receiving, from the second client device, a third indication to play back the captured audio stream using the voice capture application of the second client device during the video conference; and outputting instructions to cause the second client device to play back the captured audio stream.

Example 8 is the method of example(s) 1, wherein the first indication includes a message from a voice capture application of the second client device of the second client device, the voice capture application of the second client device comprising the audio stream of the pronunciation of the one or more words spoken by the user of the first client device and caused to be captured by another user, and further comprising: determining a name of the user of the first client device from the one or more words spoken by the user of the first client device; and based on the name of the user of the first client device, associating the one or more words spoken by the user with a profile of the user of the first client device.

Example 9 is a non-transitory computer-readable medium storing a set of instructions, the set of instructions comprising: one or more instructions that, when executed by one or more processors of a device, cause the device to: receive, from a first client device of a plurality of client devices, an audio stream of a pronunciation of one or more words, each of the plurality of client devices configured to join a video conference hosted by a video conference provider, the video conference having a plurality of participants using the plurality of client devices; associate the audio stream of the pronunciation with a user of the first client device; receive, from a second client device of the plurality of client devices, a first indication to play back the pronunciation; responsive to the first indication, provide, to the second client device, the audio stream of the pronunciation; and output instructions to cause the second client device to play back the audio stream of the pronunciation.

Example 10 is the non-transitory computer-readable medium of example(s) 9, further comprising receiving a plurality of indications corresponding to at least the first and second client devices joining the video conference, wherein the first indication includes a message from a profile application of the second client device, the profile application of the second client device comprising a profile of the user of the first client device, wherein the profile application of the second client device is caused to send the message during the video conference.

Example 11 is the non-transitory computer-readable medium of example(s) 9, further comprising the instructions: receive a plurality of indications corresponding to at least the first and second client devices joining the video conference, wherein: the audio stream of the pronunciation of the one or more words is captured using a voice recording application of the first client device; and the first indication is an indication to play back the audio stream of the pronunciation using a voice recording application of the second client device during the video conference.

Example 12 is the non-transitory computer-readable medium of example(s) 9, further comprising the instructions: receive a plurality of indications corresponding to at least the first and second client devices joining the video conference; receive, from the second client device, a second indication to capture the audio stream of the pronunciation of the one or more words spoken by the user of the first client device using a voice capture application of the first client device during the video conference; receive, from the first client device, a captured audio stream of the pronunciation of the one or more words spoken by the user of the first client device; receive, from the second client device, a third indication to play back the captured audio stream using the voice capture application of the second client device during the video conference; and outputting instructions to cause the second client device to play back the captured audio stream.

Example 13 is the non-transitory computer-readable medium of example(s) 9, wherein the first indication includes a message from a voice capture application of the second client device, the voice capture application comprising the audio stream of the pronunciation of the one or more words spoken by the user of the first client device and caused to be captured by another user, and further comprising the instructions: determine a name of the user of the first client device from the one or more words spoken by the user of the first client device; and based on the name of the user of the first client device, associate the one or more words spoken by the user with a profile of the user of the first client device.

Example 14 is the non-transitory computer-readable medium of example(s) 9, further comprising instructions: generate a pre-recorded voice message, wherein the pre-recorded voice message includes the one or more words spoken by the user of the first client device; substitute the audio stream of the pronunciation of the one or more words for the one or more words in the pre-recorded voice message; and output the pre-recorded voice message to the first client device.

Example 15 is a system comprising: one or more processors; one or more memory devices communicatively coupled to the one or more processors; a plurality of client devices, including a first client device and a second client device, the first client device and the second client device configured to join a video conference hosted by a video conference provider, the video conference having a plurality of participants using the plurality of client devices; and the video conference provider configured to: receive an audio stream of a pronunciation of one or more words; associate the audio stream of the pronunciation with a user of the first client device; receive, from the second client device, a first indication to play back the pronunciation; responsive to the first indication, provide, to the second client device, the audio stream of the pronunciation; and output instructions to cause the second client device to play back the audio stream of the pronunciation.

Example 16 is the system of example(s) 15, further comprising joining, by the first client device and the second client device, the video conference, wherein the first indication includes a message from a profile application of the second client device, the profile application of the second client device comprising a profile of the user of the first client device, wherein the profile application of the second client device is caused to send the message during the video conference.

Example 17 is the system of example(s) 15, further comprising instructions: joining, by the first client device and the second client device, the video conference, wherein: the audio stream of the pronunciation of the one or more words is captured using a voice recording application of the first client device; and the first indication is an indication to play back the audio stream of the pronunciation using a voice recording application of the second client device during the video conference.

Example 18 is the system of example(s) 15, further comprising instructions: join, by the first client device and the second client device, the video conference; receive, by the video conference provider, from the second client device, a second indication from to capture the audio stream of the pronunciation of the one or more words spoken by the user of the first client device using a voice capture application of the first client device during the video conference; receive, by the video conference provider, from the first client device, a captured audio stream of the pronunciation of the one or more words spoken by the user of the first client device; receive, by the video conference provider, from the second client device, a third indication to play back the captured audio stream using a voice capture application of the second client device during the video conference; and output additional instructions, by the video conference provider, to cause the second client device to play back the captured audio stream.

Example 19 is the system of example(s) 15, wherein the first indication includes a message from a voice capture application of the second client device, the voice capture application comprising the audio stream of the pronunciation of the one or more words spoken by the user of the first client device and caused to be captured by another user, and further comprising instructions: determining a name of the user of the first client device from the one or more words spoken by the user of the first client device; and based on the name of the user of the first client device, associating the one or more words spoken by the user with a profile of the user of the first client device.

Example 20 is the system of example(s) 15, further comprising an interactive voice response system, further comprising instructions: generating, by the interactive voice response system, a pre-recorded audio message, wherein the pre-recorded audio message includes the audio stream of the pronunciation of the one or more words.

That which is claimed is:

1. A method, comprising:
   receiving, from a first client device of a plurality of client devices, a request to join a video conference hosted by a video conference provider, the video conference having a plurality of participants using the plurality of client devices;

responsive to the request, outputting first instructions to cause the first client device to display a waiting room user interface, comprising a user interface for a voice recording application;

receiving, from the first client device, an audio stream of a pronunciation of one or more words captured using the voice recording application;

associating the audio stream of the pronunciation with a user of the first client device;

receiving, from a second client device of the plurality of client devices, a first indication to play back the pronunciation;

responsive to the first indication, providing, to the second client device, the audio stream of the pronunciation; and outputting instructions to cause the second client device to play back the audio stream of the pronunciation.

2. The method of claim 1, wherein the first indication includes a message from a profile application of the second client device, the profile application comprising a profile of the user of the first client device.

3. The method of claim 1, further comprising receiving a plurality of indications corresponding to at least the first and second client devices joining the video conference, wherein the first indication includes a message from a profile application of the second client device, the profile application of the second client device comprising a profile of the user of the first client device, wherein the profile application of the second client device is caused to send the message during the video conference.

4. The method of claim 1, wherein the first indication includes a message from a voice recording application of the second client device, the voice recording application of the second client device comprising the audio stream of the pronunciation of the one or more words generated by the user of the first client device.

5. The method of claim 1, further comprising receiving a plurality of indications corresponding to at least the first and second client devices joining the video conference, wherein:
the audio stream of the pronunciation of the one or more words is captured using the voice recording application of the first client device; and
the first indication is an indication to play back the audio stream of the pronunciation using a voice recording application of the second client device during the video conference.

6. The method of claim 1, wherein the first indication includes a message from a voice capture application of the second client device, the voice capture application of the second client device comprising the audio stream of the pronunciation of the one or more words spoken by the user of the first client device and caused to be captured by another user.

7. The method of claim 1, further comprising:
receiving a plurality of indications corresponding to at least the first and second client devices joining the video conference;
receiving, from the second client device, a second indication to capture the audio stream of the pronunciation of the one or more words spoken by the user of the first client device using a voice capture application of the second client device during the video conference;
receiving, from the first client device, a captured audio stream of the pronunciation of the one or more words spoken by the user of the first client device;
receiving, from the second client device, a third indication to play back the captured audio stream using the voice capture application of the second client device during the video conference; and
outputting instructions to cause the second client device to play back the captured audio stream.

8. The method of claim 1, wherein the first indication includes a message from a voice capture application of the second client device of the second client device, the voice capture application of the second client device comprising the audio stream of the pronunciation of the one or more words spoken by the user of the first client device and caused to be captured by another user, and further comprising:
determining a name of the user of the first client device from the one or more words spoken by the user of the first client device; and
based on the name of the user of the first client device, associating the one or more words spoken by the user with a profile of the user of the first client device.

9. A non-transitory computer-readable medium storing a set of instructions, the set of instructions comprising:
one or more instructions that, when executed by one or more processors of a device, cause the device to:
receive, from a first client device of a plurality of client devices, a request to join a video conference hosted by a video conference provider, the video conference having a plurality of participants using the plurality of client devices;
responsive to the request, output first instructions to cause the first client device to display a waiting room user interface, comprising a user interface for a voice recording application;
receive, from the first client device, an audio stream of a pronunciation of one or more words captured using the voice recording application;
associate the audio stream of the pronunciation with a user of the first client device;
receive, from a second client device of the plurality of client devices, a first indication to play back the pronunciation;
responsive to the first indication, provide, to the second client device, the audio stream of the pronunciation; and
output instructions to cause the second client device to play back the audio stream of the pronunciation.

10. The non-transitory computer-readable medium of claim 9, further comprising receiving a plurality of indications corresponding to at least the first and second client devices joining the video conference, wherein the first indication includes a message from a profile application of the second client device, the profile application of the second client device comprising a profile of the user of the first client device, wherein the profile application of the second client device is caused to send the message during the video conference.

11. The non-transitory computer-readable medium of claim 9, further comprising the instructions:
receive a plurality of indications corresponding to at least the first and second client devices joining the video conference, wherein:
the audio stream of the pronunciation of the one or more words is captured using the voice recording application of the first client device; and
the first indication is an indication to play back the audio stream of the pronunciation using a voice recording application of the second client device during the video conference.

12. The non-transitory computer-readable medium of claim 9, further comprising the instructions:
  receive a plurality of indications corresponding to at least the first and second client devices joining the video conference;
  receive, from the second client device, a second indication to capture the audio stream of the pronunciation of the one or more words spoken by the user of the first client device using a voice capture application of the first client device during the video conference;
  receive, from the first client device, a captured audio stream of the pronunciation of the one or more words spoken by the user of the first client device;
  receive, from the second client device, a third indication to play back the captured audio stream using the voice capture application of the second client device during the video conference; and
  outputting instructions to cause the second client device to play back the captured audio stream.

13. The non-transitory computer-readable medium of claim 9, wherein the first indication includes a message from a voice capture application of the second client device, the voice capture application comprising the audio stream of the pronunciation of the one or more words spoken by the user of the first client device and caused to be captured by another user, and further comprising the instructions:
  determine a name of the user of the first client device from the one or more words spoken by the user of the first client device; and
  based on the name of the user of the first client device, associate the one or more words spoken by the user with a profile of the user of the first client device.

14. The non-transitory computer-readable medium of claim 9, further comprising instructions:
  generate a pre-recorded voice message, wherein the pre-recorded voice message includes the one or more words spoken by the user of the first client device;
  substitute the audio stream of the pronunciation of the one or more words for the one or more words in the pre-recorded voice message; and
  output the pre-recorded voice message to the first client device.

15. A system comprising:
  one or more processors;
  one or more memory devices communicatively coupled to the one or more processors;
  a plurality of client devices, including a first client device and a second client device, the first client device and the second client device configured to join a video conference hosted by a video conference provider, the video conference having a plurality of participants using the plurality of client devices; and
  the video conference provider configured to:
    receive, from the first client device, a request to join the video conference;
    responsive to the request, output first instructions to cause the first client device to display a waiting room user interface, comprising a user interface for a voice recording application;
    receive, from the first client device, an audio stream of a pronunciation of one or more words captured using the voice recording application;
    associate the audio stream of the pronunciation with a user of the first client device;
    receive, from the second client device, a first indication to play back the pronunciation;
    responsive to the first indication, provide, to the second client device, the audio stream of the pronunciation; and
    output instructions to cause the second client device to play back the audio stream of the pronunciation.

16. The system of claim 15, further comprising joining, by the first client device and the second client device, the video conference, wherein the first indication includes a message from a profile application of the second client device, the profile application of the second client device comprising a profile of the user of the first client device, wherein the profile application of the second client device is caused to send the message during the video conference.

17. The system of claim 15, further comprising instructions:
  joining, by the first client device and the second client device, the video conference, wherein:
    the audio stream of the pronunciation of the one or more words is captured using the voice recording application of the first client device; and
    the first indication is an indication to play back the audio stream of the pronunciation using a voice recording application of the second client device during the video conference.

18. The system of claim 15, further comprising instructions:
  join, by the first client device and the second client device, the video conference;
  receive, by the video conference provider, from the second client device, a second indication from to capture the audio stream of the pronunciation of the one or more words spoken by the user of the first client device using a voice capture application of the first client device during the video conference;
  receive, by the video conference provider, from the first client device, a captured audio stream of the pronunciation of the one or more words spoken by the user of the first client device;
  receive, by the video conference provider, from the second client device, a third indication to play back the captured audio stream using a voice capture application of the second client device during the video conference; and
  output additional instructions, by the video conference provider, to cause the second client device to play back the captured audio stream.

19. The system of claim 15, wherein the first indication includes a message from a voice capture application of the second client device, the voice capture application comprising the audio stream of the pronunciation of the one or more words spoken by the user of the first client device and caused to be captured by another user, and further comprising instructions:
  determining a name of the user of the first client device from the one or more words spoken by the user of the first client device; and
  based on the name of the user of the first client device, associating the one or more words spoken by the user with a profile of the user of the first client device.

20. The system of claim 15, further comprising an interactive voice response system, further comprising instructions:
  generating, by the interactive voice response system, a pre-recorded audio message, wherein the pre-recorded audio message includes the audio stream of the pronunciation of the one or more words.

\* \* \* \* \*